United States Patent
Dang et al.

(10) Patent No.: US 11,137,034 B2
(45) Date of Patent: Oct. 5, 2021

(54) CLUTCH ASSEMBLY

(71) Applicant: Automatic Technology (Australia) Pty Ltd, Keysborough (AU)

(72) Inventors: Toan Dang, Keysborough (AU); George Matthews, Keysborough (AU)

(73) Assignee: Automatic Technology (Australia) Pty Ltd, Keysborough (AU)

( * ) Notice: Subject to any disclaimer, the term of this patent is extended or adjusted under 35 U.S.C. 154(b) by 0 days.

(21) Appl. No.: 16/576,410

(22) Filed: Sep. 19, 2019

(65) Prior Publication Data
US 2020/0096051 A1  Mar. 26, 2020

(30) Foreign Application Priority Data

Sep. 21, 2018 (AU) ............................ 2018903560
Sep. 27, 2018 (AU) ............................ 2018903651

(51) Int. Cl.
| | | |
|---|---|---|
| *F16D 11/14* | (2006.01) | |
| *F16D 23/12* | (2006.01) | |
| *E06B 9/74* | (2006.01) | |

(52) U.S. Cl.
CPC ............ *F16D 11/14* (2013.01); *F16D 23/12* (2013.01); *E06B 9/74* (2013.01); *F16D 2023/123* (2013.01)

(58) Field of Classification Search
CPC ........................ F16D 11/14; F16D 2023/123
See application file for complete search history.

(56) References Cited

U.S. PATENT DOCUMENTS

| | | | | |
|---|---|---|---|---|
| 2013/0133447 | A1* | 5/2013 | Leivenzon | .............. F16H 19/02 |
| | | | | 74/89.16 |
| 2019/0063509 | A1* | 2/2019 | Wittig | ...................... F16D 23/12 |
| 2020/0088242 | A1* | 3/2020 | Wang | ...................... F16D 11/14 |

FOREIGN PATENT DOCUMENTS

AU         2007101214 A4 *  2/2008

OTHER PUBLICATIONS

Translation of AU2007101214, retrieved from espacenet.com in Feb. 2021 (Year: 2021).*

* cited by examiner

*Primary Examiner* — Stacey A Fluhart
(74) *Attorney, Agent, or Firm* — Barnes & Thornburg LLP; Jeffrey R. Stone

(57) ABSTRACT

A clutch assembly for a roller door operator, the clutch assembly providing selective engagement with a drive wheel, the clutch assembly comprising: a rotatable shaft rotatable relative to the drive wheel; a clutch disc supported in a clutch lever and arranged to rotate with the rotatable shaft, the clutch disc and clutch lever configured to rotate relative to one another around the axis of rotation of the shaft; and a clutch cam supported in a clutch base, the clutch base configured to permit operative rotation of the clutch cam around the axis of rotation of the shaft in a first direction; wherein the clutch lever is operatively associated with the clutch cam so that rotational movement of the clutch lever in a second direction opposite to the first direction actuates movement of the clutch disc and the clutch lever axially along the rotatable shaft to engage or disengage the clutch disc with the drive wheel, and subsequent rotational movement of the clutch lever in the first direction actuates rotational movement of the clutch cam relative to the clutch base in the first direction.

15 Claims, 9 Drawing Sheets

CLUTCH ASSEMBLY

FIELD OF THE INVENTION

The present invention relates to a clutch assembly. In particular, the clutch assembly is configured to engage and disengage an electric motor from a drive train. The present invention also provides a door operator (such as a roller door operator) including such a clutch assembly.

BACKGROUND OF THE INVENTION

Powered closures, such as sliding, roller, tilt or sectional doors, shutters, gates and the like are in common use for access control to areas, such as garages, car parks, private property, warehouses, factories, etc. Such closure arrangements are typically driven by operator units incorporating electric motors coupled to drive the closure between open and closed positions in an appropriate manner.

In the event of a power failure, fire or other unforeseen eventualities, the motor of such an operator unit may not be operable, and it is therefore desirable that manual operation of the closure be readily achieved independently of the motor. Indeed, for safety reasons it is often a requirement that selective manual operation be provided for powered closures.

For roller doors or shutters in domestic applications where the operator unit may be mounted above head height of a user, manual operation of such closures may be achieved by way of disengaging a drive shaft from a drive train via a clutch assembly. Prior systems provide a clutch cord that a user can pull to disengage the clutch assembly to allow for manual operation of the door. The user can pull the clutch cord again to reengage the clutch assembly to allow for motor driven door control.

In one form, such prior clutch assemblies use a leaf spring to act as a ratchet pawl to provide this disengage and subsequent reengage action. However, the leaf springs are prone to wear and tear under normal use and can eventually break.

Further, when installing a door operator unit and setting the door travel parameters, technicians can overestimate the downwards travel of the door. In this case, the bottom of the door hits the ground each time it closes and this can cause a force to pass from the door, through the drive train and ultimately to the leaf spring, causing the leaf spring to buckle or fail.

Further, consumers and installation requirements now demand door operator units with slimmer profiles than in the past. Thus, for a given power of operator, it is desirable to provide a compact, low profile clutch assembly that can be accommodated with all related components in a generally slimmer profile door operator unit than hitherto available.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In one aspect, the present invention provides a clutch assembly for a roller door operator, the clutch assembly providing selective engagement with a drive wheel, the clutch assembly comprising: a rotatable shaft rotatable relative to the drive wheel; a clutch disc supported in a clutch lever and arranged to rotate with the rotatable shaft, the clutch disc and clutch lever configured to rotate relative to one another around the axis of rotation of the shaft; and a clutch cam supported in a clutch base, the clutch base configured to permit operative rotation of the clutch cam around the axis of rotation of the shaft in a first direction; wherein the clutch lever is operatively associated with the clutch cam so that rotational movement of the clutch lever in a second direction opposite to the first direction actuates movement of the clutch disc and the clutch lever axially along the rotatable shaft to engage or disengage the clutch disc with the drive wheel, and subsequent rotational movement of the clutch lever in the first direction actuates rotational movement of the clutch cam relative to the clutch base in the first direction.

Advantageously, the present invention provides a clutch assembly for a roller door operator that eliminates the need for a leaf spring to act as a ratchet pawl in providing the disengage and engage action. Instead, the present invention utilises a clutch base and a clutch cam that are together configured to permit operative rotation of the clutch cam in only one direction, whilst allowing the other components of the clutch assembly to move as is necessary as part of the engagement and disengagement mechanism. To clarify, the permission of operative rotation in a single direction means that while rotation in the second direction may occur (to an extent), this rotation is prevented from continuing to the point at which an operative action takes place. This means the load that would ordinarily be borne by the leaf spring is instead directed through the clutch base, which provides a more even distribution of loading over a significantly larger load area (and thus the bearing of greater loads) than possible with prior solutions.

Another advantage of the present invention is it affords a low profile clutch assembly, whereby a user can selectively engage or disengage the motor by a single pull on a clutch string or other actuating component.

In an embodiment, the clutch base comprises two or more base ramps and two or more base mating walls, and wherein the clutch cam comprises two or more ratchet teeth, each of which comprises a rear surface and a mating wall, wherein the rear surfaces of the ratchet teeth are configured to slide over the base ramps so causing abuttal of the base mating walls and the ratchet teeth to prevent rotational movement of the clutch cam relative to the clutch base in the second direction.

Advantageously, these surfaces of the clutch base and the clutch cam together cooperate to permit rotation of the clutch cam in only a single direction, as well as share the load ordinarily experienced by a leaf spring in clutch assembly designs. In this embodiment, the base mating walls are static, and thus do not experience the compression and flexures that a leaf spring experiences during each engagement and disengagement action. Overall, the clutch assembly of this embodiment is less prone to the same level of wear. A further advantage arises in that any overloading in this embodiment of the clutch assembly is shared amongst a number of base mating walls as compared to a single leaf spring experiencing the brunt of the load. The ratchet teeth may comprise outriggers extending radially outwardly from the clutch cam.

In an embodiment, the clutch cam includes, extending around its front surface, a high flat adjacent a low flat with an engage mating wall provided therebetween, wherein a clutch cam ramp extends between the low flat to a peak higher than the high flat with a disengage mating wall provided between the high flat and the peak. This configuration of the clutch cam provides a means of engagement for the clutch lever.

In an embodiment, the engagement of the clutch lever and the clutch cam is realised by the clutch lever also comprising a rear surface including a lever ramp and a lever mating wall, wherein the lever ramp slides over the front surface of the clutch cam during rotational movement of the clutch lever in the second direction so causing abuttal of the lever mating wall and one of the engage mating wall and the disengage mating wall, and wherein the clutch cam rotates in the first direction with subsequent rotation of the clutch lever in the first direction. This particular embodiment further enhances the desire to provide a low or flat profile clutch assembly by using specifically shaped surfaces that provide the necessary action for the clutch assembly to engage and disengage with the motor, whilst still ensuring the clutch assembly is sufficiently compact in order to fit within a conventional roller door operator.

In an embodiment, the clutch cam comprises an alignment tab protruding over the engage mating wall. An advantage of the alignment tab is that it allows for a slight back rotation of the clutch lever, which can assist with the engagement of the clutch disc and drive wheel.

In an embodiment, the clutch assembly includes a spring configured to store torsional energy from the rotational movement of the clutch lever in the second direction, the spring also configured to release the stored torsional energy so causing the subsequent rotation of the clutch lever in the first direction. Preferably, the spring is a cylindrical spring. This further allows a compact profile of the clutch assembly.

In an embodiment, one end of the rotatable shaft provides input to a position encoder. Advantageously, this provides a means to determine the location of the door directly from the rotatable shaft.

In another aspect, the present invention provides a clutch assembly for a door operator, providing selective engagement between a motor and a door drive, the clutch assembly having a clutch base, a clutch cover and a clutch mechanism including one or more rotating cam or ratchet elements and configured to provide alternate engagement and disengagement between the motor and door drive with successive actuation and release actions of a clutch lever between a first position and a second position, the mechanism including a torsion spring to bias the clutch lever to said first position, wherein a part of the torsion spring can be accessed externally of the clutch cover in order to pre-load the torsion spring once the clutch mechanism has been assembled between the clutch base and the clutch cover.

Preferably, the torsion spring also acts as a compression spring to bias the components of the clutch mechanism together for operative interaction.

Preferably, the clutch cover includes a guidance part such as a slot (for example, an arcuate slot) through which said part of the torsion spring passes to afford external access thereto, the slot allowing movement of said part of the torsion spring between positions of increasing torsional pre-load. The slot may include one or more detent positions configured to provide retention of said part of the torsion spring in one or more prescribed pre-load states.

In an embodiment, the torsion spring is a substantially cylindrical spring. A first end portion of the torsion spring may be connected to the clutch lever, said part of the torsion spring being the second end portion, arranged to protrude through the clutch cover. The second end portion may be shaped (eg. coiled) to provide for easy manual manipulation in the pre-loading operation.

It will be understood that the torsion spring may include a separate or integral handle which provides the accessibility of the torsion spring external of the clutch cover.

Advantageously, this aspect of the invention allows that the components of the clutch assembly may be assembled before the torsion spring is pre-loaded (or before it is fully pre-loaded). This provides a safer assembly process for the clutch assembly, which otherwise would require pre-loading (or higher pre-loading) of the torsion spring during the assembly process. Of further advantage is that a user can simply and conveniently provide the requisite pre-loading of the torsion spring from a position external of the cover portion, without potentially disturbing the arrangement of the assembled components (as they are securely retained in their operational configuration between the clutch base and the clutch cover) through the pre-loading operation.

In another aspect, the present invention provides a clutch assembly for a roller door operator, the clutch assembly providing selective engagement with a drive wheel, the clutch assembly comprising a clutch cam with a first and second face, having spaced ratchet elements on the first face to interact with spaced pawl elements on a supporting surface against which the cam rotates, the cam having spaced alternating axial offset surfaces on the second face to interact with one or more spaced drive elements on a clutch lever, such that successive actuations and releases of the clutch lever alternately set different axial offsets between the clutch lever and the supporting surface, so alternating a rotatable driven element carried by the clutch lever between engaged and disengaged conditions with a rotatable input drive element.

In yet another aspect, the present invention provides a clutch assembly for a roller door operator, the clutch assembly providing selective engagement between a motor and a door drive via a clutch assembly output drive shaft, the clutch assembly having a clutch base, a clutch cover and a clutch mechanism including one or more cam or ratchet elements arranged to rotate around the axis of said clutch assembly output drive shaft and configured to provide alternate engagement and disengagement between the motor and the clutch assembly output drive shaft with successive actuation and release actions of a clutch lever between a first position and a second position, the clutch assembly including a position encoder unit mountable to said clutch cover, the position encoder unit having an input shaft arranged to be driven directly by said clutch assembly output drive shaft.

Preferably, said position encoder unit includes an absolute position encoder, such as a Hall effect sensor arranged to sense the rotational position of a magnetic element driven by rotation of the position encoder input shaft, configured such that 360° of rotation of the magnetic element corresponds to more than the full travel of a door driven by the roller door operator. Preferably the position encoder unit includes a worm gear drive connecting the position encoder input shaft and the magnetic element.

In this way, the clutch assembly and position encoder unit can be provided as a single unit, which unit can also include a motor when attached thereto. Providing all of these components in a single assembly significantly simplifies design and assembly of the door operator, at the same time affording a very compact profile.

In a further aspect, the present invention provides a door operator including a clutch assembly in accordance with any of the above-defined aspects.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 4b is a side elevation cross section of the clutch lever and clutch disc of FIG. 4a;

FIG. 5 is a rear perspective view of the clutch disc of FIG. 4a;

FIG. 11 is a rear perspective view of the clutch lever and clutch disc of FIG. 4a;

DETAILED DESCRIPTION OF THE EMBODIMENTS

Figure 1:
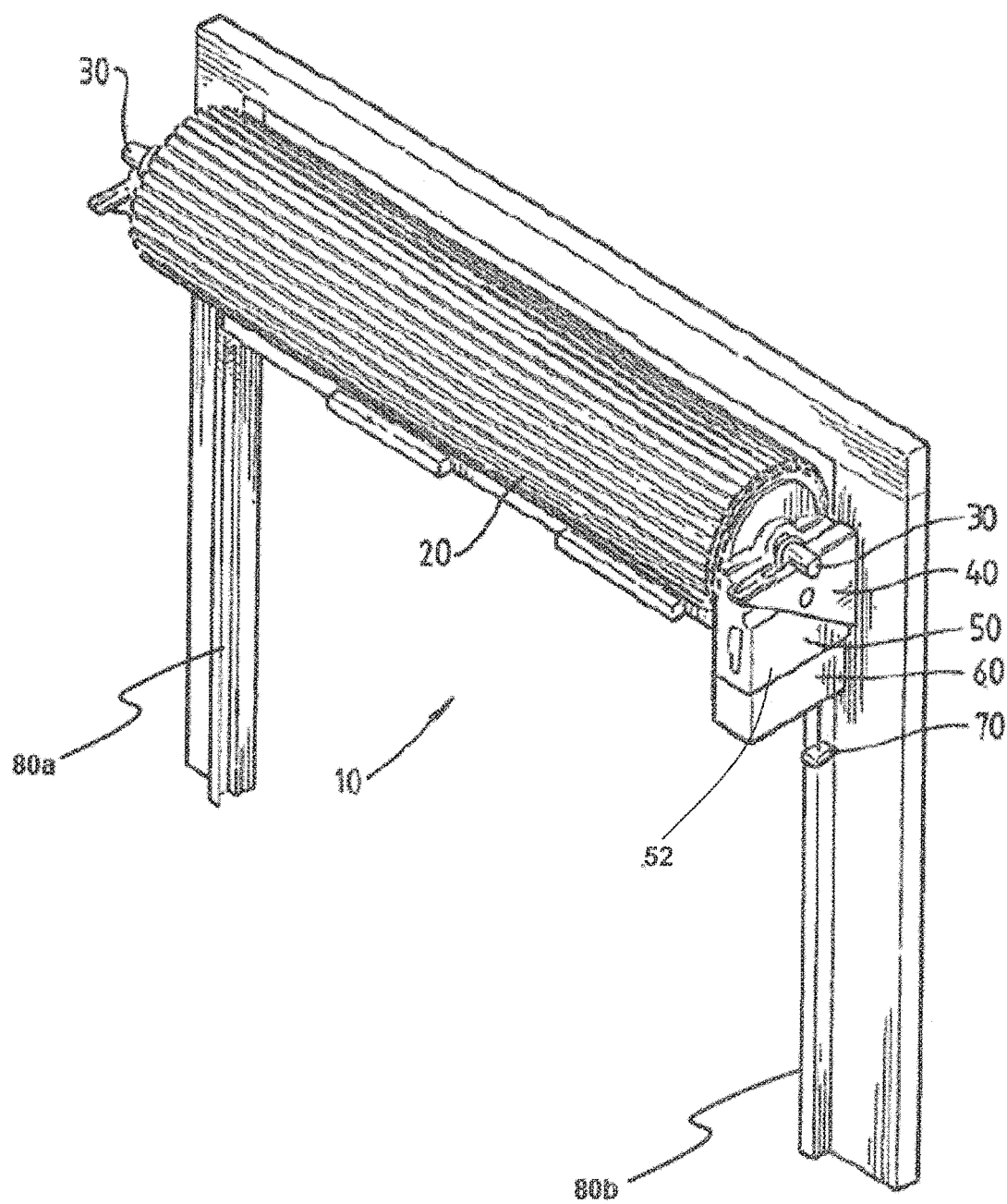
FIG. 1 illustrates an installed garage roller door system.

FIG. 1 illustrates a roller door system 10 that includes a drum-mounted roller door 20 on an axle 30 mounted on end brackets 40 at each end thereof. At one end of axle 30, there is provided a door operator unit 50. The door operator unit 50 includes a controller 60, which includes programmable circuitry to manage the various functions of the system. Controller 60 includes or is coupled to a signal receiver for receiving control commands from a user's remote control transmitter device (not shown). The roller door system 10 includes opposing guide tracks 80a,b that guide the travel of the door 20. Whilst FIG. 1 depicts a roller door system, it will be understood that the invention herein described is applicable to other forms of doors (eg. overhead doors, tilt doors, etc), gates, shutters, curtains and other types of movable closures.

Figure 2:
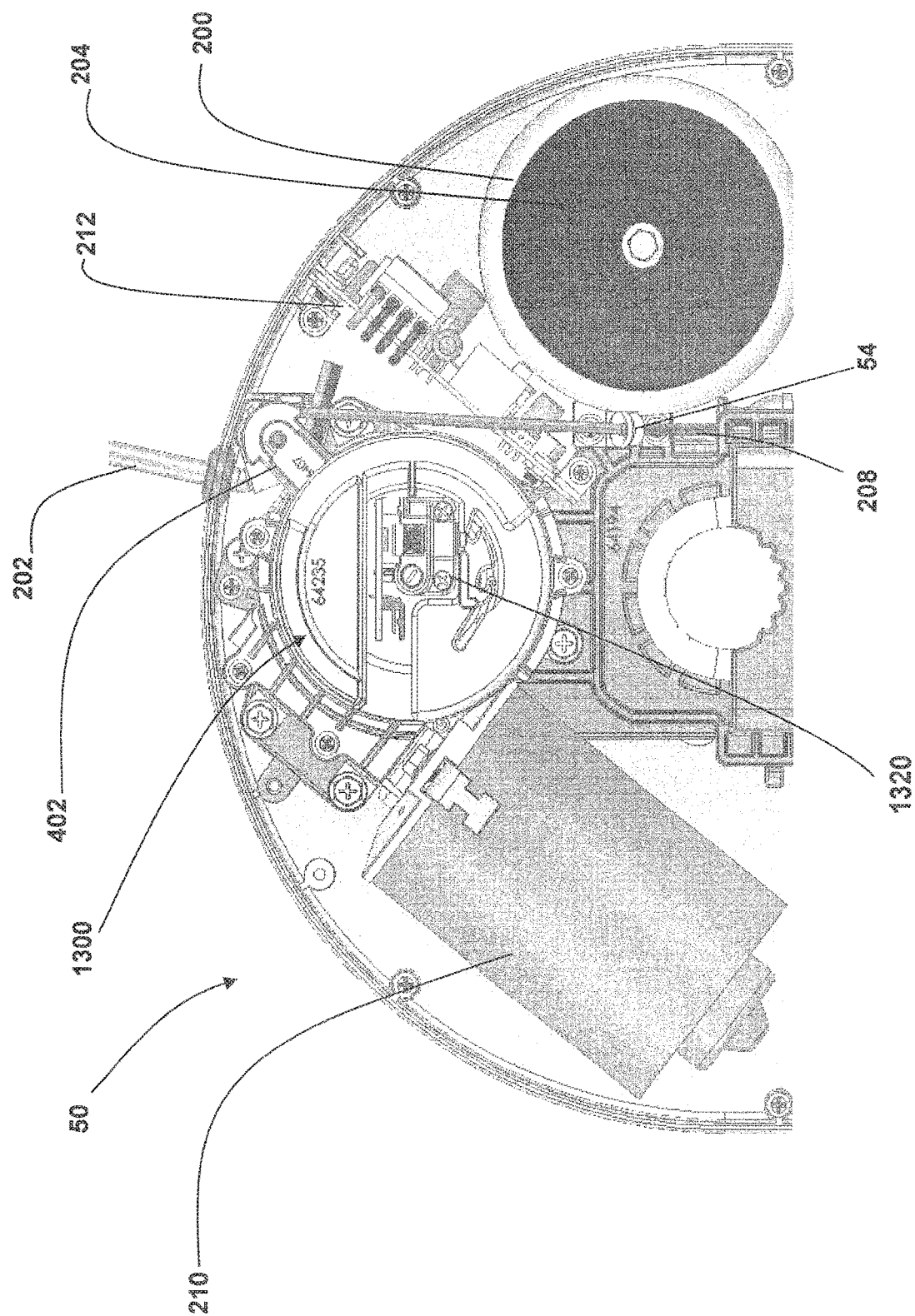
FIG. 2 is a partial front elevation view of a garage door operator unit (with its casing removed) incorporating the clutch assembly of the invention.

Door opener unit 50 comprises a housing 52 that contains various mechanical and electrical componentry used to operate the unit, i.e. drive movement of the roller door 20 between open and closed positions by moving the roller door 20 along the guide tracks 80a,b. The door operator unit 50 includes an electric motor 210 and an associated drive train (FIG. 2). Door operator unit 50 also includes pull handle 70 for engaging and disengaging the drive train from roller door 20 in the event manual operation of the door is required. For example, a power cut or failure of one or more of the mechanical and electrically componentry may necessitate a user to manually open or close the door 20.

Reference is now made to FIG. 2, which illustrates a portion of the front of the door opener unit 50 with a cover of the housing 52 removed. Any reference to the "front" of the operator unit 50 or the components therein is a reference to the view shown in FIG. 2. References to "clockwise" or "counter clockwise" are to be taken about the perspective shown in FIG. 2. Reference to "downward" is taken to be towards the lower end of FIG. 2.

The door operator unit 50 comprises a clutch assembly 1300 of an embodiment the present invention that will be described in greater detail below. The door operator unit also includes a transformer 200 arranged to be electrically connected to AC mains power via a power lead 202 that plugs into a wall socket. The transformer steps down the received mains power for ultimate transmission to the electric motor 210 at a suitable voltage level via, for example, a rectifier provided on a printed circuit board 212. The transformer 200 is held in place in part by a transformer washer 204. In an embodiment, the electric motor is a 24V DC electric motor, though any suitable motor may be used. The electric motor 210 drives a drive train that ultimately opens or closes the door 20 when the clutch assembly 1300 is engaged.

Engagement and disengagement of the clutch assembly 1300 is achieved by the application of a pulling force on a clutch pull cord 208, which is threaded through a clutch assembly lever 402. This engagement will be described in greater detail below. The clutch pull rod 208 follows a pre-determined path within the housing 52, where it is guided and maintained along this path by a pull cord guide 54, mounted within housing 52 and adjacent transformer 202. The pull cord guide 54 alleviates the need for any additional anchoring point within the housing 52, which typically has limited spacing amongst the tightly packed electrical and mechanical components. From the clutch assembly lever 402, the clutch pull cord 208 extends downward along the path, through pull cord guide 54 and ultimately extends downward and away from the door operator unit 50 near the centre of housing 52 for remote actuation of the clutch assembly 1300 by a user. It will be understood that when the user applies a pulling force on pull handle 70 (i.e. provides a pulling force on clutch pull cord 208), the clutch assembly lever 402 will move in the downward direction, rotating clockwise, leading to engagement or disengagement of clutch assembly 1300.

Figure 3:
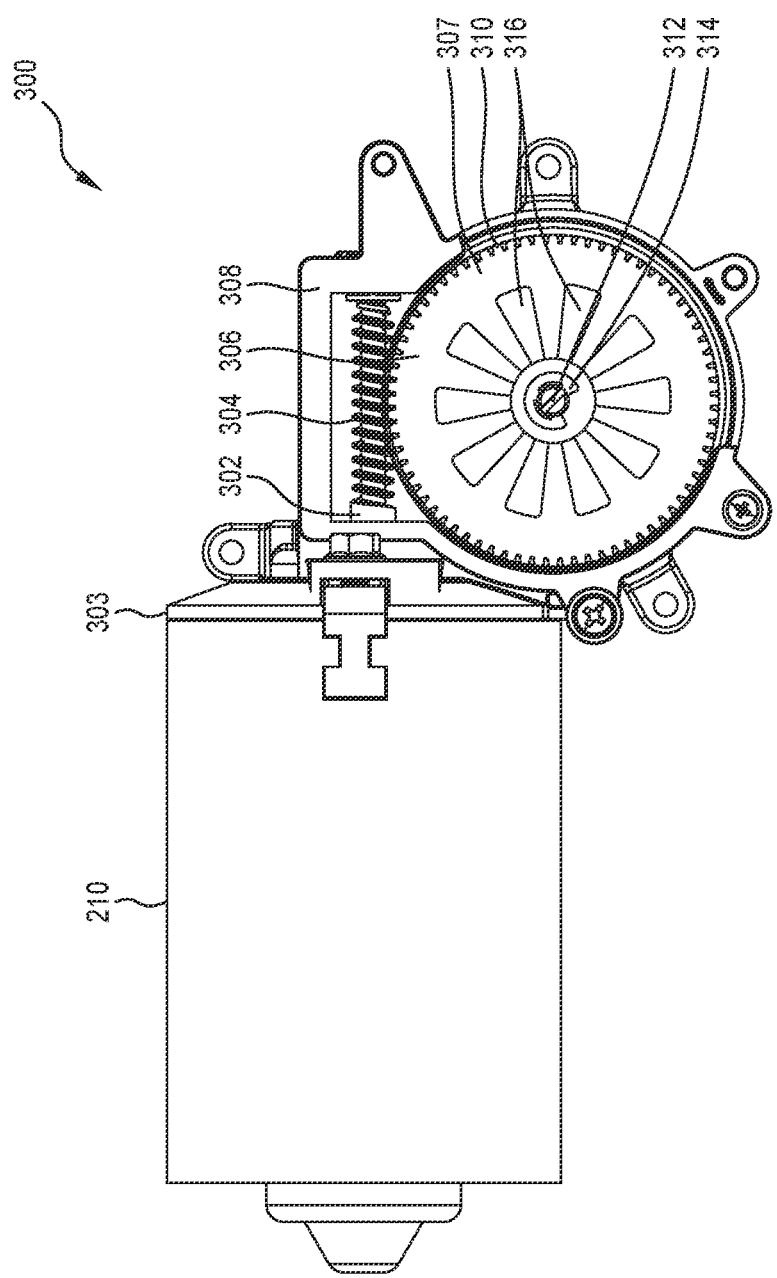
FIG. 3 is a plan view of an electric motor and gearbox used in conjunction with the clutch assembly of FIG. 2.

Reference is now made to FIG. 3, which shows a gearbox base 300 used in conjunction with the clutch assembly 1300 of this embodiment. Electric motor 210 drives the drive train, which includes the gearing arrangement contained within gearbox housing 308, that ultimately causes the door 20 to open or close when the clutch assembly 1300 is engaged. Gearbox base 300 is positioned within operator unit 50, with gearbox housing 308 secured inside the housing 52 of operator unit 50 and also to electric motor 210, thereby securing the electric motor 210 inside the door operator unit 50. The electric motor 210 is attached to the gearbox base 300 by a motor base 303. Motor base 303 may be integral with gearbox base 300, or a separate component secured between the gearbox base 300 and the electric motor 210.

Electric motor 210 comprises an output shaft 302 that is connected to or comprises a worm gear 304. When the worm gear 304 is driven by the output shaft 302, the worm gear 304 in turn drives a drive wheel 306. The drive wheel 306 is mounted for rotation within gearbox housing 308. The drive wheel 306 is typically a helical gear, although other suitable gear types may be used. Drive wheel 306 includes a planar front surface 307, a planar rear surface parallel and longitudinally spaced from the planar front surface 307, and a side surface having a plurality of helical gear teeth 310.

Drive wheel 306 is driven by worm gear 304 by the meshing of worm gear 304 with the teeth 310 of the drive wheel 306. A rotatable shaft 312 passes through a central aperture of the drive wheel 306 and protrudes in a perpendicular direction to the front surface 307 of drive wheel 306. When clutch assembly 1300 is disengaged, the rotatable shaft 312 is freely rotatable relative to drive wheel 306. This allows for manual operation of the door 20. This is because rotation of the rotatable shaft 312 causes rotation of a pinion 602 (FIG. 6) positioned on the opposite end of the rotatable shaft (the pinion 602 and rotatable shaft 312 are fixedly connected or integral with each other), which drives a drum (such as an internally geared drum) provided on door operator unit 50 and connected to a roller drum of the door 20, thereby causing door 20 to move between open and closed positions.

Figure 4A:
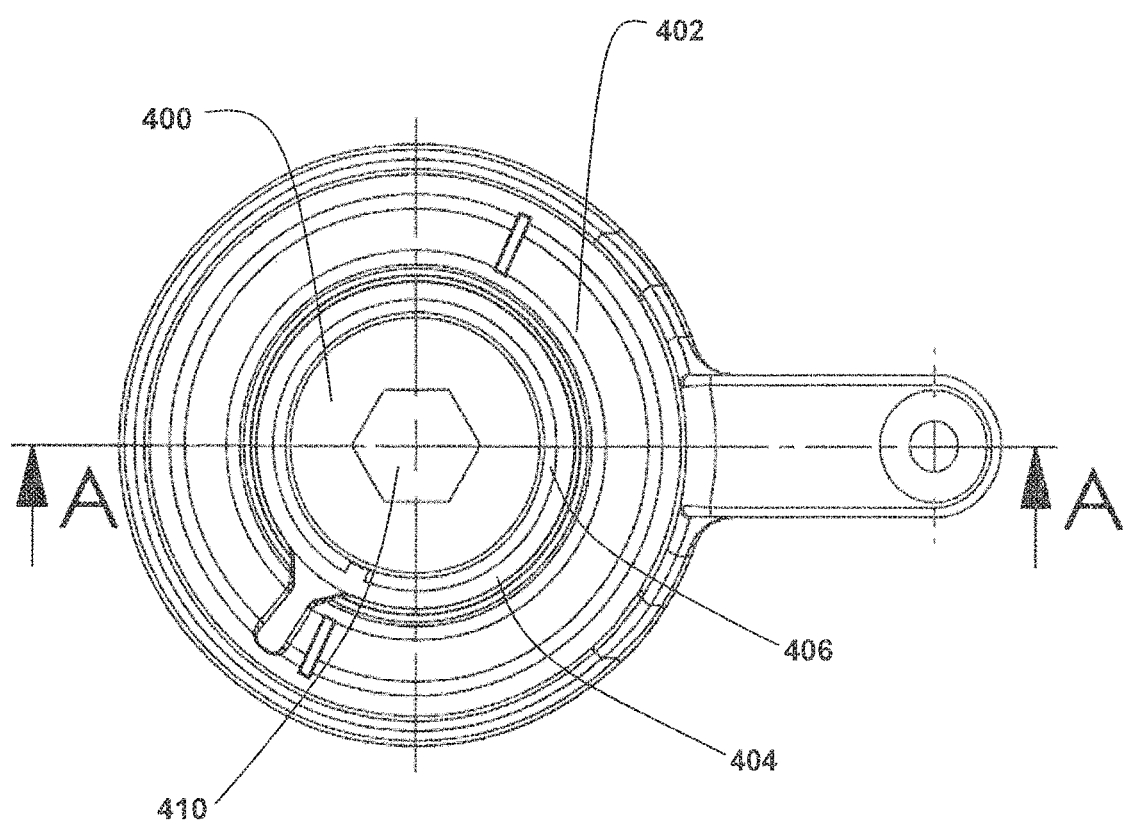
FIG. 4a is a plan view of a clutch lever and a clutch disc, which are components of the clutch assembly of FIG. 2.
Figure 4B:
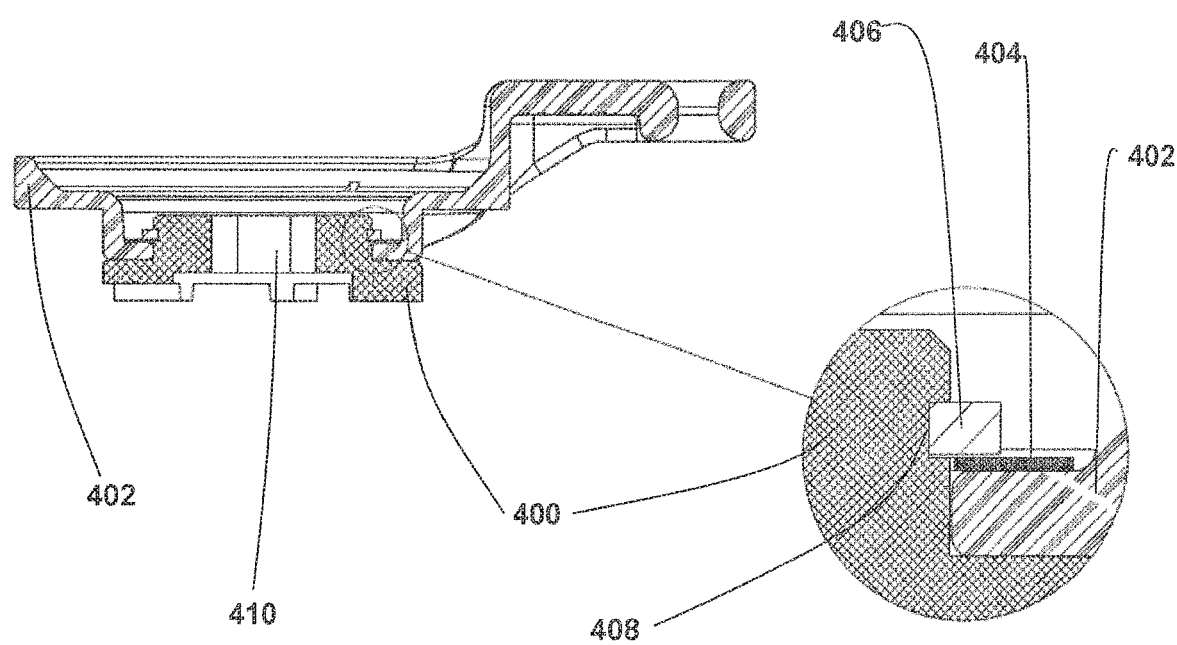

Referring to FIGS. 3, 4a and 4b, rotatable shaft 312 is configured to be received by a clutch disc 400 that comprises part of clutch assembly 1300. Rotatable shaft 312 is in rotatable engagement with clutch disc 400 such that the two rotate together irrespective of whether clutch assembly 1300 is engaged or disengaged. When the clutch assembly 1300 is engaged, closing and opening of door 20 is controlled by the output of electric motor 210, i.e. the output shaft 302 causes rotation of worm 304, which in turn rotates drive wheel 306, which in turn drives clutch disc 400 and thus rotatable shaft 312. When the clutch assembly 1300 is disengaged, manual operation of door 20 is allowed. Manual movement of the door 20 causes pinion 602 and thus rotatable shaft 312 to rotate (which is free to rotate within drive wheel 306), which in turn drives clutch disc 400, which is free to rotate within clutch lever 402.

Clutch disc 400 is mounted for rotation on clutch lever 402 (which itself forms part of clutch assembly 1300). Clutch disc 400 is freely rotatable relative to clutch lever 402, i.e. clutch disc 400 and clutch lever 402 rotate relative to each other about the longitudinal axis of rotatable shaft 312. In this embodiment, clutch disc 400 is held in rotatable engagement with clutch lever 402 by a thrust washer 404 and a circlip 406. Circlip 406 engages a groove 408 in clutch disc 400.

Clutch disc 400 and clutch lever 402 are thus configured to move together in the axial direction of rotatable shaft 312. As described in further detail below, when the clutch assembly 1300 moves from an engaged position to a disengaged position, the clutch disc 400 along with clutch lever assembly 402 move in the axial direction along rotatable shaft 312 away from drive wheel 306. Conversely, when the clutch assembly 1300 moves from a disengaged position to an engaged position, the clutch disc 400 along with clutch lever assembly 402 move in the axial direction along rotatable shaft 312 towards drive wheel 306. Clutch disc 400 is keyed to rotatable shaft 312 in any suitable manner. In the depicted embodiment, the rotatable shaft 312 has a hexagonal cross-section that is configured to be received by a commensurate hexagonal aperture 410 provided in clutch disc 400. However, the rotatable shaft 312 and aperture 410 may assume other commensurate shapes. For example, a spline joint between the rotatable shaft 312 and aperture 410 may be used.

The clutch assembly 1300 is configured to be selectively engageable with drive wheel 306. Specifically, clutch disc 400 is configured to engage with drive wheel 306 by being pushed axially along rotatable shaft 312 towards the drive wheel's front surface 307, and clutch disc 400 is configured to disengage with drive wheel 306 by being pushed axially along rotatable shaft 312 in the other direction away from the drive wheel's front surface 307.

Drive wheel 306 is not able to move axially within gearbox housing 308, i.e. its movement is limited to rotation about the longitudinal axis of the rotatable shaft 312. A circlip 314 is provided on the front surface 307 of drive wheel 306 in a groove around rotatable shaft 312 in order to prevent axial movement of drive wheel 306 along the rotatable shaft 312.

As will be understood, the auto-locking nature of worm drives ensures that drive wheel 306 cannot be driven manually. That is, movement of drive wheel 306 can only be driven by worm 304 when worm 304 is driven by electric motor 210, be it clockwise or anticlockwise depending on which way output shaft 302 and thus worm 304 is driven by the electric motor 210. Consequently, whether door 20 is being opened or closed is dependent on whether the electric motor is driven forwards or backwards.

Figure 5:
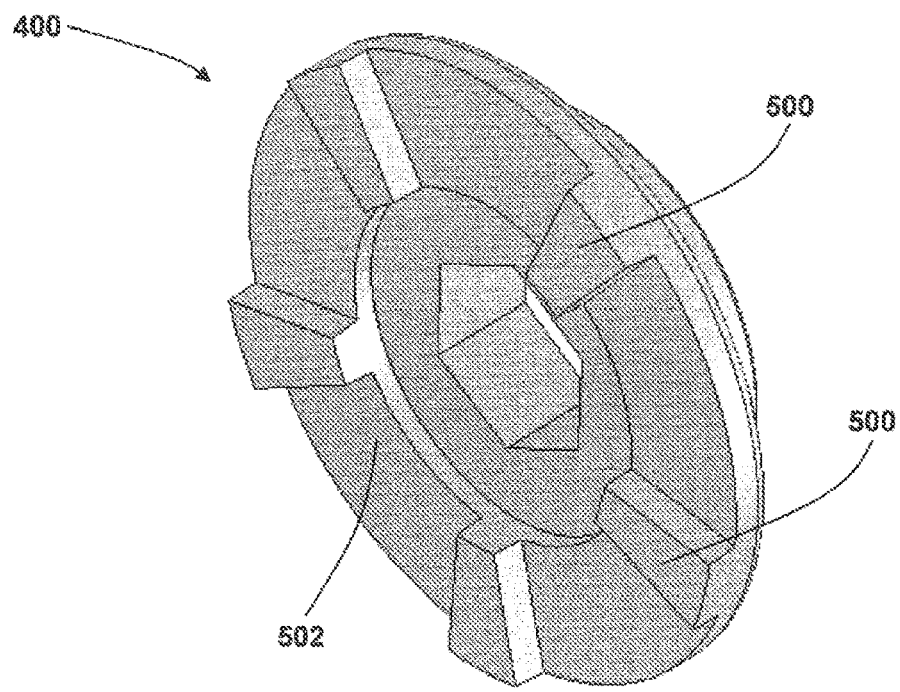

Engagement of drive wheel 306 and clutch disc 400 can be achieved in any suitable manner. In this embodiment, drive wheel 306 includes a plurality of recesses 316 angularly equispaced about rotatable shaft 312 in front surface 307. Recesses 316 are configured to receive a plurality of dogs 500 that extend from a rear surface 502 of clutch disc 400 (FIG. 5). The dogs 500 are similarly angularly equispaced about aperture 410 on the rear surface 502 of clutch disc 400. Axial movement of the clutch disc 400 along the rotatable shaft 312 towards the drive wheel 306 causes the dogs 500 to be received within recesses 316. Conversely, axial movement of the clutch disc 400 away from the drive wheel 306 causes the dogs 500 to move out of engagement with the recesses 316 of drive wheel 306. Engagement of the dogs 500 in recesses 316 therefore keys the clutch disc 400 to the drive wheel 306 so that the two rotate together. The number of dogs 500 may be less than the number of recesses, or there may be the same number of dogs as recesses. As it will be appreciated by a person skilled in the art, the positioning of the dogs and recesses may be mutually interchangeable, i.e. the dogs 500 may instead be on the drive wheel 306 with the recesses on clutch disc 400.

In view of the description above, it will be clear to a person skilled in the art that when clutch disc 400 is moved axially along rotatable shaft 312 towards the front surface 307 of drive wheel 306 and engages with drive wheel 306, manual rotation of rotatable shaft 312 is prevented. This is because of the combination of: drive wheel 306 not being rotatable manually due to the nature of worm drive systems preventing back driving of the motor; clutch disc 400 being engaged and thus locked to drive wheel 306; the rotatable engagement between clutch disc 400 and rotatable shaft 312; clutch disc 400 being prevented from rotating means that rotatable shaft 312 is prevented from rotating. Thus, when the clutch assembly 1300 is engaged, door 20 can only be opened or closed when the electric motor 210 causes worm 304 to drive the drive wheel 306. It logically follows that when clutch disc 400 is moved axially along rotatable shaft 312 away from the front surface 307 of drive wheel 306 and disengages with drive wheel 306, rotatable shaft 312 can be manually rotated. This is because clutch disc 400 is free to rotate within clutch lever 402. A user manually moving the door open or closed causes the door drum to rotate, thus causing the pinion 602 to rotate which causes the rotatable shaft 312 and clutch disc 400 to rotate.

Figure 6:
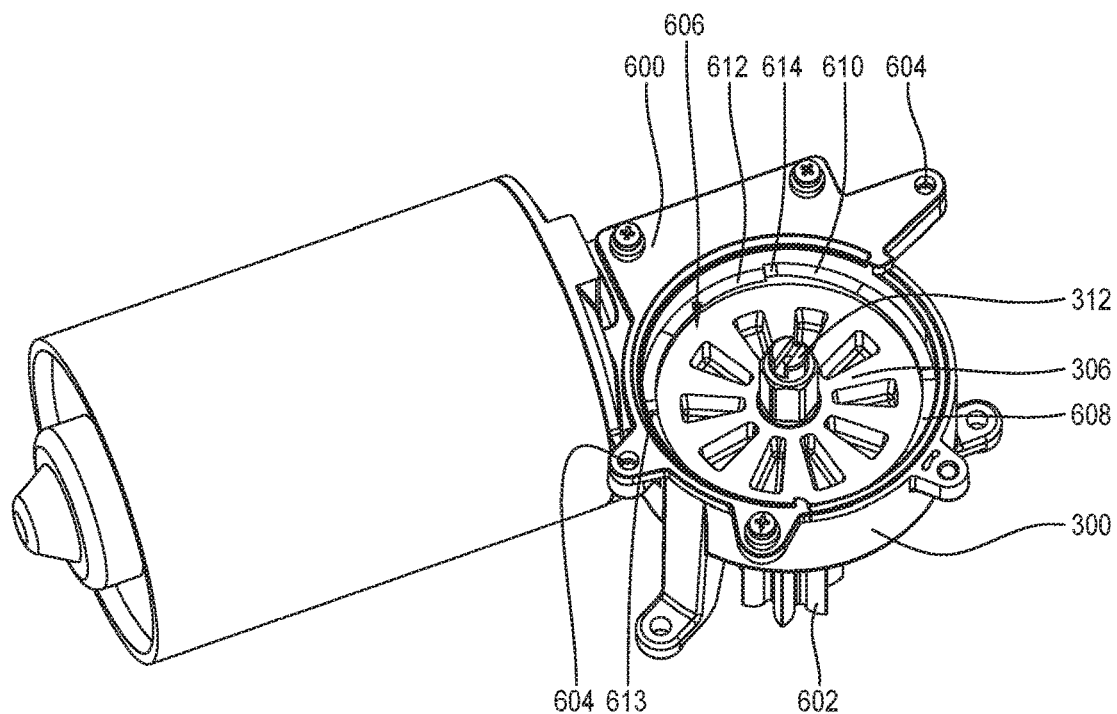
FIG. 6 is a front perspective view of the electric motor and gearbox of FIG. 3 with a clutch base, which is a component of the clutch assembly of FIG. 2.

Further components of the clutch assembly 1300 will now be described. With reference to FIG. 6, there is provided a clutch base 600 fixedly mounted on gearbox base 300. Clutch base 600 may be mounted to gearbox base 300 in any suitable manner so that there is no relative movement between the clutch base 600 and gearbox base 300. In this embodiment, clutch base 600 includes fastening surfaces 604. Fastening surfaces 604 are intended to rest on corresponding surfaces of gearbox base 300 and receive screws through a number of holes to fixedly connect the clutch base 600 with gearbox base 300. Clutch base 600 includes a through-bore 606 through which rotatable shaft 312 passes when clutch base 600 is mounted on gearbox base 300. Through-bore 606 allows front surface 307 of drive wheel 306 to be exposed and allows for clutch disc 400 to be moved forward and back through through-bore 606 for engagement and disengagement of clutch assembly 1300.

Clutch base 600 includes an internally directed continuous flange 608 extending from a rear surface of clutch base 600, flange 608 being peripheral to through-bore 606. The front surface of flange 608 supports a plurality of base ramps 610 that extend from adjacent base flats 612. Between respective base ramps 610 and base flats 612 is a base mating wall 613. The base mating walls 613 are angularly equispaced around the periphery of through-bore 606. In the depicted embodiment, there are four base ramps 610, four base flats 612 and four base mating walls 613, all with mutual 90° separation, although any suitable number of these components may be provided (typically an equal number of each component will be provided). In an alternative embodiment, the gearbox base 300 may support the base ramps 610, base flats 612 and base mating walls 613, without the need for a separate clutch base 600. In such a case, gearbox base 300 comprises part of the clutch assembly 1300.

Travelling circumferentially around flange 608 (and from the perspective depicted in FIG. 6), each base ramp 610 initiates at the level of an adjacent base flat 612 and, following the curvature of arcuate flange 608, rises to a peak, at which a peak flat 614 is provided. The base ramp 610 then abruptly falls to meet the beginning of the next base flat 612, thereby defining the base mating wall 613. Thus, four base mating walls are provided equispaced 90° around flange 608. The base flats 612 are all on the same level, i.e. on a plane perpendicular to the through-bore 606. The peak flats 614 are also on a common level, i.e. on a plane perpendicular to a longitudinal axis of the through-bore 606 and spaced axially away from the plane of the base flats 612, which is parallel to the plane of the peak flats 614, by the distance or length of the base mating wall 613 i.e. the distance between the base flat and peak flat. In an embodiment, the arcs of base flats 612 are longer than the arcs of base ramps 610 when viewed from above.

Each base mating wall 613 acts as a ratchet pawl in that it is configured to permit rotation of a clutch cam 700 (FIGS. 7 and 8) around the longitudinal axis of rotatable shaft 312 in one operative direction (counter clockwise in the depicted embodiments). By operative direction, what is meant is that rotation in the opposite direction will be stopped and thus have no operative effect (as described below). This construction is particularly advantageous over prior clutch assemblies that utilised leaf springs in place of the present mating walls 613. Leaf springs are prone to failure from wear and overloading, an issue that at least this embodiment of the present invention generally avoids, as the base mating walls 613 are static, and thus do not experience the compression and flexures that a leaf spring experiences during each engagement and disengagement action. Overall, the present construction is less prone to the same level of wear. A further advantage arises in that forces in the present clutch assembly 1300 are shared amongst a number of base mating walls 613 as compared to a single leaf spring experiencing the totality of the load.

As will become apparent with regard to this embodiment, the engagement and disengagement of clutch assembly 1300 (through the axial movement of clutch disc 400 in and out of engagement with drive wheel 306) is provided by rotational movement of various components by at least 90°, i.e. the angle between successive base mating walls 613. In an alternative variant including only two base ramps 610, two base flats 612 and two base mating walls 613, rotation of various components by at least 180° causes the engagement and disengagement of clutch assembly 1300.

Figure 7:
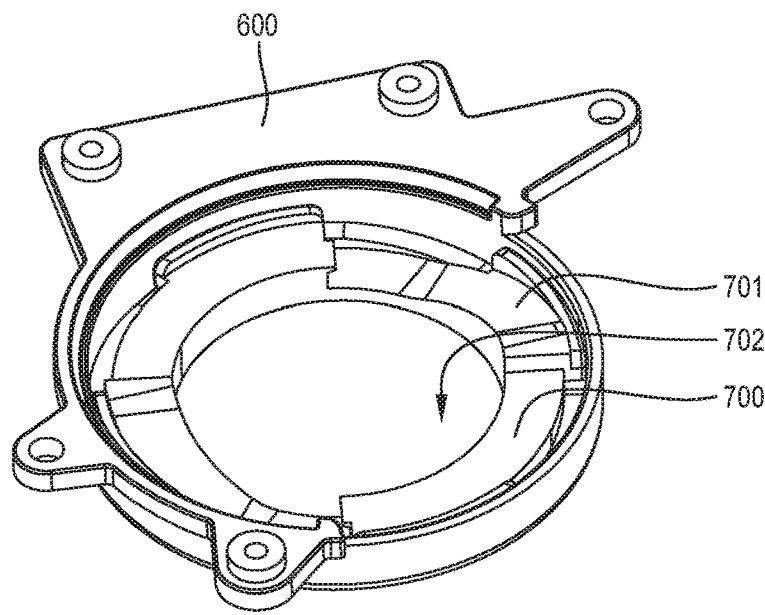
FIG. 7 is a front perspective view of the clutch base of FIG. 6 with a clutch cam, which is a component of the clutch assembly of FIG. 2.
Figure 8:
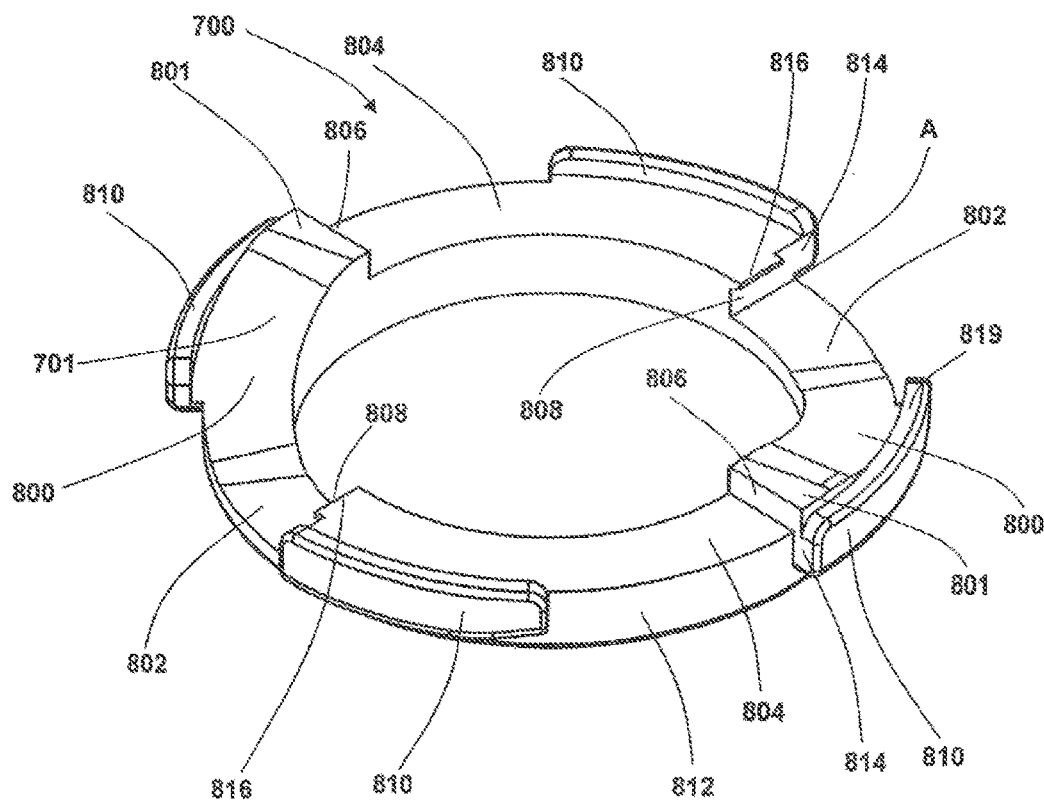
FIG. 8 is a front perspective view of the clutch cam of FIG. 7.
Figure 9:
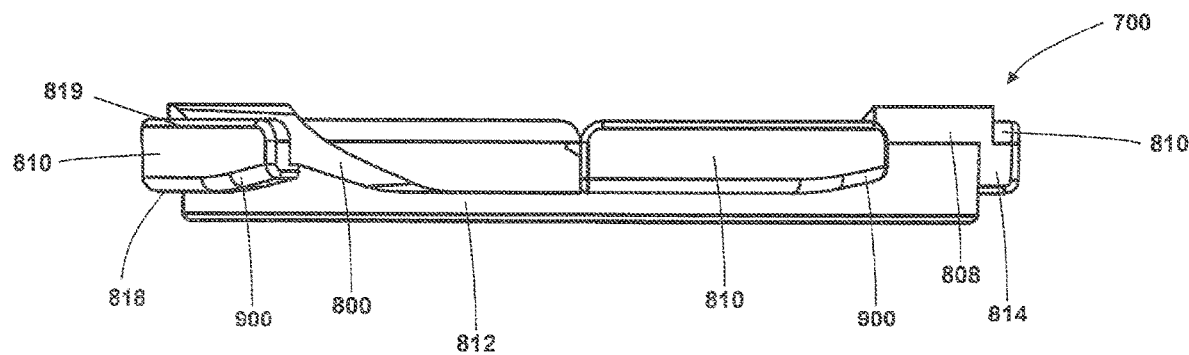
FIG. 9 is a side elevation view of the clutch cam of FIG. 7.

With reference to FIG. 7, clutch cam 700 can be shown when in position and supported by clutch base 600. In the depicted embodiment, clutch cam 700 is supported on flange 608 of clutch base 600. Clutch cam 700 includes a ring-shaped front surface 701. Clutch cam 700 includes a through-bore 702 through which rotatable shaft 312 and clutch disc 400 pass, similarly to clutch base 600. Specific features of clutch cam 700 are shown in FIGS. 8 and 9. Clutch cam 700 includes one or more outriggers 810, each of which comprises a rear outrigger surface 818, an outrigger mating wall 814, and an outrigger ramp section 900 adjacent the rear outrigger surface 818. The outrigger mating walls 814 are typically spaced equidistant around the clutch cam 700. The one or more outriggers 810 project radially outwardly from clutch cam 700. In the depicted embodiment, four outriggers 810 project out from an external periphery or side wall of clutch cam 700.

Each outrigger has a first end surface that lines up with, is in the same plane as and is an extension of a corresponding mating wall 806,808. This first end surface defines outrigger mating wall 814. Outrigger ramp section 900 slopes upwards (relative to the view in FIG. 9) from rear outrigger surface 818 towards an outrigger front surface 819 and towards a second end surface (opposed the first end surface) of the outrigger 810. The slope corresponds to and follows the same arcuate path as the slope of base ramps 610.

The rear outrigger surfaces 818 are configured to slide over the abutting surfaces on the clutch base 600, thereby allowing rotation of clutch cam 700 relative to clutch base 600. This rotation in a counter clockwise direction is caused by a force applied by clutch lever 402, which sits on top (relative to the view shown in FIG. 10) of clutch cam 700 as will be described below. For example, the rear outrigger surfaces 818 are moved over flange 608 of clutch base 600. When the rear outrigger surface 818 moves from a base flat 612 along and over base ramps 610, the outrigger 810 slips, i.e. moves axially towards the front surface 307 of drive wheel 306, wherein the base mating walls 613 and the outrigger mating walls 814 abut. The abuttal prevents rotational movement in an opposite direction (clockwise in the depicted embodiment) of the clutch cam 700 relative to the clutch base 600. Preferably, the same number of outriggers 810 (and thus outrigger mating walls 814) is present as base ramps 610, base flats 612 and base mating walls 613. When clutch cam 700 is positioned in clutch base 600, the rear surface 818 of each outrigger 810 sits on the front surface (i.e. the surface comprising base ramps 610 and base flats 612) of flange 608; and external side surface 812 of clutch cam 700 sits adjacent the internal side surface of flange 608.

Travelling circumferentially around front surface 701 of clutch cam 700, there is provided a high flat 804 adjacent to a low flat 802 with an engage mating wall 808, defined by a drop off wall, provided therebetween. It will be appreciated from the description and certain figures, that references to "high" in this context will mean being more frontward and references to "low" in this context will mean being more rearward. The high flat 804 and low flat 802 are flat surfaces of front surface 701 of the clutch cam 700, with the high flat assuming a higher position relative to low flat 808. The high flat 804 extends 90° around the front surface 701 before falling to meet the beginning of the adjacent low flat 802. From the low flat 802, a clutch cam ramp 800 begins and culminates at a clutch cam peak surface 801. Clutch cam peak surface 801 is higher, i.e. more frontward, than high flat 804. The arc from the beginning of a low flat 802 to the end of clutch cam peak surface 801 of clutch cam ramp 800 is 90°. A disengage mating wall 806, defined by another drop off wall, is provided between the clutch cam peak surface 801 and an adjacent high flat 804. It will be appreciated that the height of engage mating wall 808 (the drop between a high flat 804 and low flat 802) is greater than the height of a disengage mating wall 806 (the drop between clutch cam peak surface 801 and high flat 804).

In this way, progressing clockwise around clutch cam 700, as depicted in FIG. 8, from point A (0°), the clutch cam's front surface 701 follows this sequence: low flat 802, clutch ramp 800, clutch cam peak surface 801, disengage mating wall 806 (90°), high flat 804, engage mating wall 808 (180°), low flat 802, clutch ramp 800, disengage mating wall 806 (270°), high flat 804, engage mating wall 808 (360°). In the depicted embodiment, there are two each of high flats 804, low flats 802, clutch cam ramps 800, disengage mating walls 806 and engage mating walls 808. However, any suitable number of these components may be provided. Similarly to the clutch base 600, clutch cam 700 has a mating wall (be it an engage mating wall 808 or disengage mating wall 806) provided angularly spaced equidistant around clutch cam 700. The four mating walls 806,808 provide an engagement or disengagement action by the relative rotational movement of various components by 90°. As would be clear from the figures, engagement and disengagement of the clutch assembly 1300 will thus be effected by rotation of the clutch cam 700 by at least 90° within clutch base 600.

In the depicted embodiment, clutch cam 700 includes one or more alignment tabs 816 protruding outwardly from high flat 804 and engage mating wall 808 and over low flat 802. When the clutch assembly 1300 is engaged, alignment tabs 816 allow for a slight over-rotation of clutch lever 402. When the rear surfaces of clutch lever 402 (described in detail below) pass over alignment tabs 816, it will be forced axially rearward (i.e. towards drive wheel 306) along rotatable shaft 312 (causing engagement of the clutch assembly) and then slightly rotate back to abut with engage mating wall 808. This slight back rotation assists with clutch disc 400 and drive wheel 306 engaging, for example, by aiding the alignment of the corresponding recesses 316 and dogs 500.

When clutch cam 700 rotates, ramp sections 900 engage with base ramps 610, and the outrigger rear surface 818 slide across base ramps 610, causing clutch cam 700 to rise (i.e. axially along the length of rotatable shaft 312 away from drive wheel 306) relative to clutch base 600. The outrigger mating walls 814 move slightly beyond their corresponding base mating walls and the outrigger rear surfaces 818 drop onto base flats 612. During this rotation, clutch cam 700 rotates 90°. Clutch cam 700 can only operatively rotate counter clockwise in the embodiment illustrated in the drawings. This is because once clutch cam 700 drops, clockwise rotation of clutch cam 700 will be stopped when base mating walls 613 engage and abut with outrigger mating walls 814. This 90° clutch cam 700 rotation is repeated each time the lever is pulled. Hence, a ratchet mechanism is provided between clutch base 600 and clutch cam 700, with ratchet teeth provided by outrigger mating walls 814 (spaced every 90°), and pawls provided by base mating walls 613 (spaced every 90°).

Figure 11:
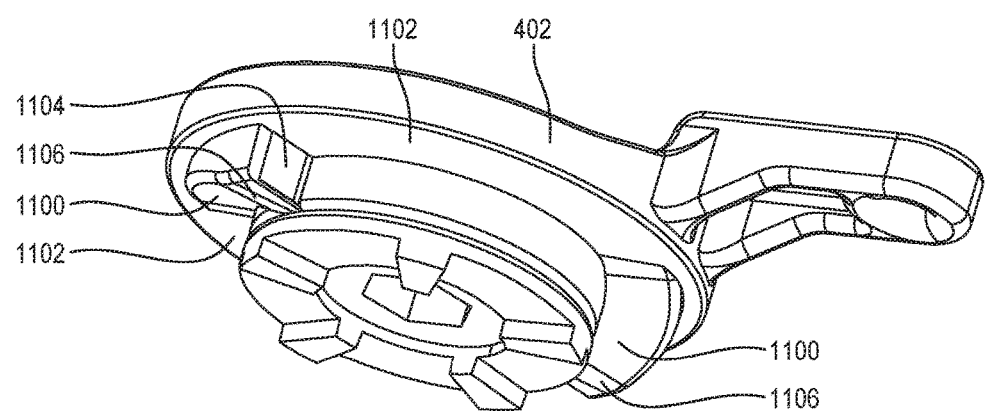
Figure 10:
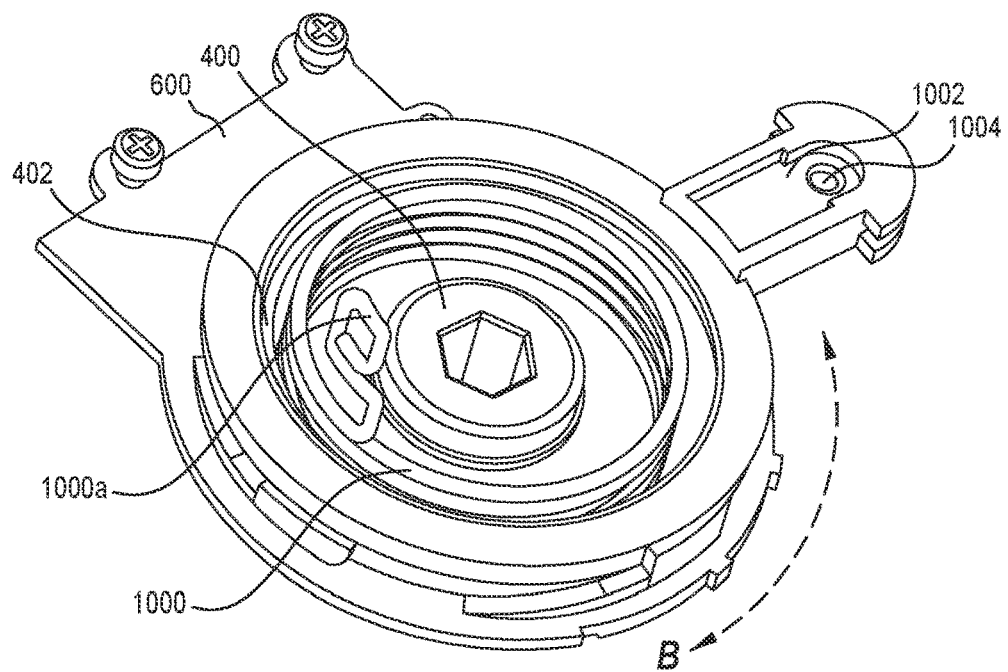
FIG. 10 is a front perspective view of the clutch base of FIG. 6 assembled with the clutch cam and the clutch lever and clutch disc of FIG. 4a, and a spring.
Figure 13:
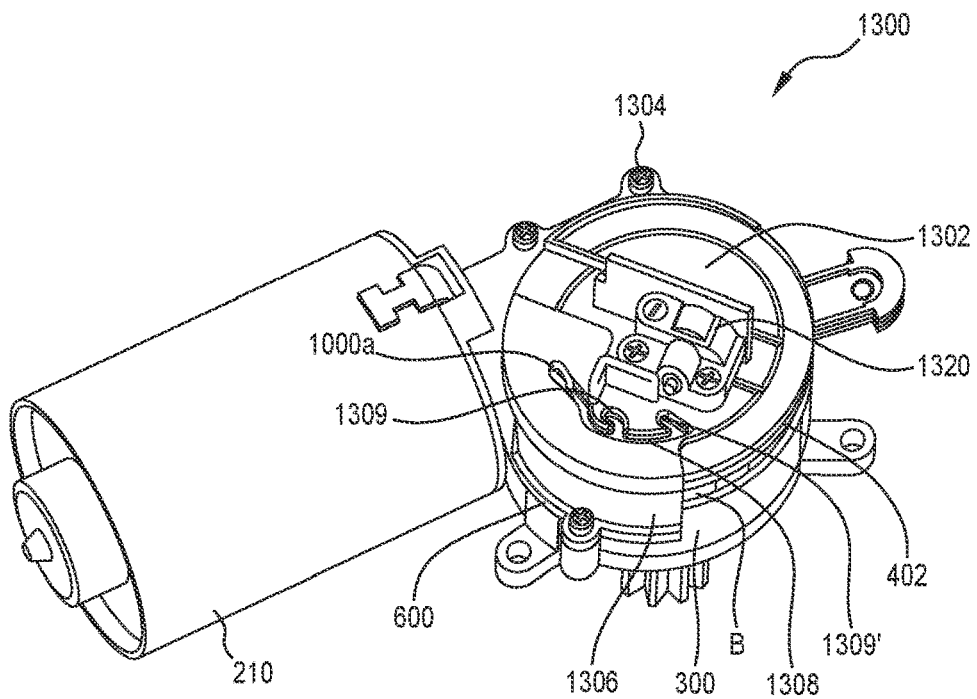
FIG. 13 is a perspective view of the assembled clutch assembly of FIG. 2.

Reference is now made to FIGS. 10 and 11, which illustrate the functioning of clutch lever 402. Clutch lever 402 is supported in clutch base 600, with clutch base 600 configured to allow rotation of clutch lever 402 therein. A spring 1000 is supported in clutch lever 402 and above (from the perspective of FIG. 10) clutch disc 400. A first end (obscured) of spring 1000 is fixed to clutch lever 402 and thus rotates with clutch lever 402. A second end 1000a of spring 1000 is fixed to a component that does not rotate with clutch lever 402, namely clutch cap 1302 (FIG. 13). Spring 1000 has two functions in the clutch assembly 1300. First, spring 1000 provides an axial compression force downwards, i.e. towards drive wheel 306, to clutch lever 402 and clutch disc 400 in order to engage clutch disc 400 with drive wheel 306. Secondly, spring 1000 provides a torsional return force to clutch lever 402. In this embodiment, spring 1000 is a cylindrical spring. This allows the clutch assembly 1300 to have an overall thinner profile. However, other springs may be used that allow for suitable functioning of the clutch assembly 1300.

With reference to FIG. 10, a user pulls a lever arm 1002 (via pull handle 70 and clutch pull cord 208) connected to or integral with clutch lever 402, thereby causing clutch lever 402 to rotate clockwise from an initial resting position to an actuated position (when lever arm 1002 is rotated from the rest position to position B). Lever arm 1002 comprises an aperture 1004 configured to receive clutch pull cord 208 (not shown in FIG. 10). The clutch string 208 may be tied or looped so that a user can actuate clutch lever 402 remotely. The pulling of the lever arm 1002 applies a torsional force on spring 1000, thereby storing energy in the spring 1000. When the clutch lever 402 is actuated, i.e. causing engagement or disengagement of the clutch assembly 1300, the user releases the force on the lever arm 1002. The stored energy in the spring 1000 will be released, and thereby rotates clutch lever 402 anticlockwise back to the rest position.

FIG. 11 shows the rear side of clutch lever 402 and the surfaces that cooperate with the front surface 701 of clutch cam 700 when clutch lever 402 is actuated. There is provided on the rear side of clutch lever 402 two arcuate lever ramps 1100 adjacent to two arcuate lever flats 1102. Each lever ramp 1100 initiates from a lever flat 1102, and following the curvature thereof rises to a peak height (similarly to previously described ramps and peaks). Adjacent the peak of the ramp is a lever ramp flat 1106, i.e. a flat surface at the peak height of the ramp. Lever ramp 1100 then abruptly falls from the lever ramp flat 1106 to meet the beginning of the next lever flat 1102, thereby defining a lever mating wall 1104. In this embodiment, two lever mating walls 1104 are provided 180° apart around the rear side of clutch lever 402.

However, any suitable number of lever ramps may be provided in accordance with the particular detail of the clutch design.

Figure 12A:
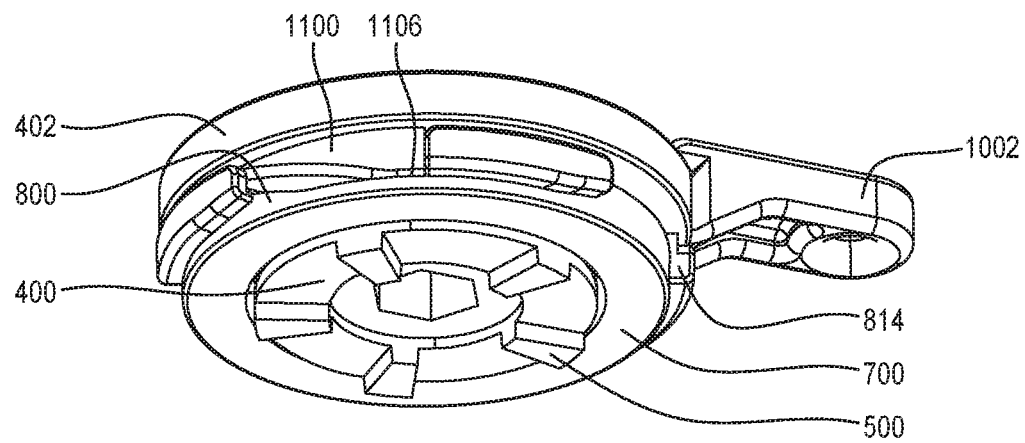
FIG. 12a is a rear perspective view of the clutch lever and clutch disc of FIG. 4a and the clutch cam of FIG. 7 showing part of the clutch assembly in an engaged state.

Referring to FIGS. 8, 11, 12*a* and 12*b* and as mentioned above, when clutch assembly 1300 is assembled, clutch base 600 supports clutch cam 700 and clutch lever 402. FIG. 12*a* shows clutch disc 400 in an engaged position (i.e. dogs 500 are engaged with recesses 316 on drive wheel 306). In this engaged position, lever mating wall 1104 is in close proximity to or abuts clutch cam's engage mating wall 808, and lever ramp flat 1106 is disposed against clutch cam's low flat 802. In this embodiment, an identical configuration is provided on the obscured opposite side. Clutch lever 402 and thus clutch disc 400 are in a lowered (more rearward) position because lever ramps 1100 abut low flats 802 rather than high flats 804. This also means that clutch disc 400 and dogs 500 protrude out of clutch cam 700 (and would also protrude through the clutch base's through-bore 606). Clutch disc 400 can now be disengaged (i.e. moved along with cam lever 402 axially away from drive wheel 306) by a user rotating cam lever 402 clockwise. This causes lever ramp flat 1106 to slide along low flat 802 and onto and along clutch cam ramp 800. Lever ramp 1100 slides along clutch cam ramp 800, rising until lever ramp flat 1106 drops off disengage mating wall 806 and onto high flat 804 of clutch cam 700. This brings lever ramp flat 1106 into contact with high flat 804 and lever mating wall 1104 into abuttal with disengage mating wall 806.

Figure 12B:
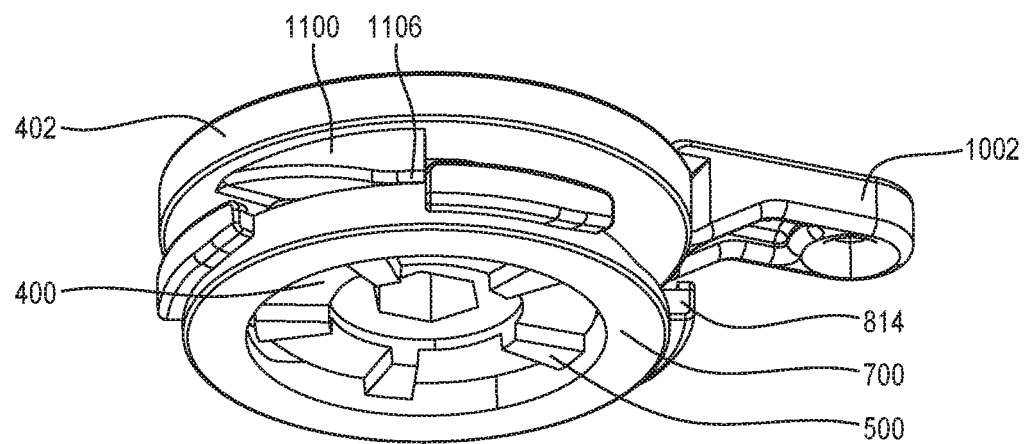
FIG. 12b is a rear perspective view of the clutch lever and clutch disc of FIG. 4a and the clutch cam of FIG. 7 showing part of the clutch assembly in a disengaged state.

During this time, both torsional energy (i.e. twisting) and axial energy (i.e. compressing) is provided to and stored in spring 1000. Also during this time, the friction force created by movement of lever ramp 1100 along clutch cam low flat 802 and ramp 800 urges clutch cam 700 to also rotate in the clockwise direction. However, this clockwise rotation of clutch cam 700 is prevented or stopped when there is engagement of outrigger mating walls 814 with opposing clutch base mating walls 613. When the user releases the load on lever arm 1002, spring 1000 releases its stored torsional energy causing clutch lever 402 to rotate 90° counter clockwise back to its rest position. Clutch cam 700 also rotates 90° counter clockwise in clutch base 600 due to the engagement of lever mating wall 1104 with disengage mating wall 806. The outrigger bottom surfaces 818 slide along and over clutch base ramps 610 during this rotation of clutch cam 700. As shown in FIG. 12*b*, clutch disc 400 is now disengaged from drive wheel 306. This means that rotatable shaft 312 is free to rotate (eg. by manual operation of the door, as explained above). Rotation of rotatable shaft 312 will cause clutch disc 400 to rotate within clutch lever 402 (clutch lever 402 will remain stationary in its rest position).

In the current disengaged state, lever mating wall 1104 is abutting or in close proximity to disengage mating wall 806 of clutch cam 700, and lever ramp flat 1106 is disposed against high flat 804 of clutch cam 700. The same configuration is provided on the opposite (obscured) side. Clutch lever 402 is in a raised (more forward) position because lever ramps 1100 abut high flats 804 rather than low flats 802 as would be the case in the engaged position. It will be clear that in the current position dogs 500 of clutch disc 400 are above the beginning of through-bore 702 of clutch cam 700, i.e. away from the front surface 307 of drive wheel 306.

In order to reengage the clutch assembly 1300, a similar process takes place, whereby a user rotates cam lever 402 clockwise approximately 90° by applying a suitable force on lever arm 1002. This rotation causes lever ramp flat 1106 to slide along the full arc of high flat 804 until lever ramp flat 1106 drops off engage mating wall 808. This drop is assisted (or indeed forced) by spring 1000 releasing its stored axial energy. The drop brings lever ramp flat 1106 into contact with low flat 802 and lever mating wall 1104 into contact with engage mating wall 808. Torsional energy is stored in spring 1000 by the user's clockwise rotation of cam lever 402. During this rotation, the friction force created by movement of lever ramp flat 1106 along high flat 804 urges clutch cam 700 to also rotate in the clockwise direction. However, this clockwise rotation of clutch cam 700 is again prevented by the engagement of outrigger mating walls 814 with opposing clutch base mating walls 613. When the user releases lever arm 1002, spring 1000 releases its stored torsional energy causing clutch lever 402 to rotate 90° counter clockwise back to its rest position. Clutch cam 700 also rotates 90° counter clockwise in clutch base 600 due to the engagement of lever mating wall 1104 with engage mating wall 808. The outrigger rear surfaces 818 slide along and over clutch base ramps 610 during this rotation of clutch cam 700. This returns the mechanism to the configuration shown in FIG. 12 with the clutch disc 400 engaged with drive wheel 306. This means that rotatable shaft 312 cannot be moved manually, but instead only by the drive from electric motor 210. Again, rotation of clutch disc 400 within clutch lever 402 (clutch lever 402 will remain stationary in its rest position) will cause rotatable shaft 312 to rotate.

FIG. 13 illustrates the clutch assembly 1300 in an assembled state. The clutch assembly includes clutch base 600, clutch cam 700, clutch disc 400, clutch lever 402, and clutch cap 1302. The second end 1000*a* of spring 1000 is held to the clutch cap 1302 through an arcuate slot 1308. A benefit that arises from this clutch assembly configuration is the ability of a user to torsionally and selectively pre-load the spring 1000 after the clutch assembly 1300 is in the assembled state and installed for use. The second end 1000*a* of spring 1000 protrudes from clutch cap 1302 and is of a shape or configuration (eg. coiled, as shown) that provides convenient engagement for the user, who can manually move, such as by finger action or tool manipulation, the second end 1000*a* of the spring 1000 from one end of the arcuate slot 1308 to one of two retention side slots 1309, 1309', shaped to provide detent positions for the second end 1000*a* of the spring 1000.

FIG. 13 shows the second end 1000*a* of the spring 1000 in its initial position (light pre-load). First side slot 1309 provides a first alternative pre-load position, whilst second side slot 1309' provides a second alternative (higher spring torsion) pre-load position. Once moved to the one of the side slots 1309, 1309', the second end 1000*a* of the spring 1000 is held in that position, thereby storing corresponding torsional energy in the spring 1000. The ability to selectively torsionally pre-load the spring 1000 after the clutch assembly 1300 has been assembled improves, amongst other things, the safety and ease of assembly of the clutch assembly 1300. It will be appreciated that the number of side slots can vary as desired, to provide multiple different torsion spring pre-load options.

Clutch cap 1302 is mounted to clutch base 600 via screws passed through corresponding fastening flanges 1304. Clutch cap 1302 provides suitable limits to the movement of clutch lever 402. In particular, a partial clutch cap side wall 1306 provides a void that allows lever arm 1002 (and thus clutch lever 402) to move between (at least) its resting position (as illustrated) and clutch actuation point B. The clutch cap side wall 1306 also prevents the lever arm 1002 from further movement by acting as a stop to further rotation of lever arm 1002.

Clutch cap 1302 also provides a shaping (eg. a shaped recessed portion) for location of a position encoder assembly 1320 (see FIGS. 2, 13), position encoder assembly 1320 comprising the mechanical and electrical components to determine the angular position of shaft 312, and therefore the angular position of the door driven therefrom. For this purpose, position encoder assembly 1320 includes an encoder input shaft that engages with a slot provided at the end of rotatable shaft 312 (see FIG. 6). The encoder input shaft includes a worm arranged to drive a gear which carries or is connected to a magnet, arranged to rotate adjacent a Hall Effect sensor mounted on a circuit board with appropriate electronics, thus affording determination of the angular position of the magnet, hence of shaft 312, and thus of the door operated by the drive output of operator unit 50. By appropriate selection of componentry, the entire travel of the door can be embraced within a single rotation of the encoder magnet, thus providing an absolute position encoder. Such an encoder is known per se from applicant's Australian Patent No. 2008341003, but not for mounting to the clutch housing of a roller door operator unit, to be driven directly from the output drive. In prior roller door operators of this sort, the position encoder assembly is mounted in another part of the operator unit, driven by a separate pinion which is itself driven by rotation of the operator's output drive drum.

In the device illustrated, the position encoder assembly 1320 uses a 12 bit digital encoder, allowing for 4096 discrete positions. This enables a resolution of approximately 0.5 mm over a 2*m* door travel (corresponding to around 5 arc minutes of rotation of the magnet, assuming the door travel is embraced within almost 360° of rotation).

In accordance with the design, clutch assembly 1300 is very slimline in profile, while comprising in a single unit all the elements (including the position encoder) of the drive assembly, the drive assembly transferring power from motor 210 to the output drive drum. Hence, and in contrast to prior devices, this compact design allows for the integration of the position encoder assembly to the clutch assembly while still maintaining the slimline profile of door operator unit 50.

Thus, it is apparent to a person skilled in the art that the clutch assembly 1300 provides for engaging and disengaging the drive train of a door operator unit 50. A user can pull the lever arm 1002 once to disengage the clutch assembly 1300, allowing the door 20 to be opened and closed manually. When disengaged, the electric motor 210 cannot drive the door 20. The user can pull the lever arm 1002 again in the same manner to engage the clutch assembly 1300 such that the door 20 can only be driven by the electric motor 210. The door 20 cannot be opened manually when the clutch assembly is engaged.

Whilst the described embodiment of the clutch assembly 1300 illustrates a configuration, whereby rotation of clutch lever 402 by 90° causes engagement and disengagement of the clutch assembly 1300, other suitable embodiments with any suitable number of components may be provided so that any suitable rotational distance is traversed to provide the engagement and disengagement mechanism. For example, an alternate embodiment may provide two base mating walls 613 angularly equispaced 180°, two clutch cam mating walls 806,808 angularly equispaced 180°, and one or two clutch lever mating walls 1104. This alternate embodiment may require rotation of the clutch lever 402 by 180° in order to successfully actuate the clutch assembly 1300. Similarly, more of these components can be provided, resulting in the clutch lever being rotated over a lesser angular extent to successfully actuate clutch assembly.

A person skilled in the art will appreciate that the various components described can be made from any suitable plastics or metals that satisfy the load and friction requirements of the clutch assembly. In the device illustrated, the primary components of clutch assembly 1300 are fabricated from the following materials:

Clutch disc 400—powder steel SMF5040
Clutch lever 402—DURACON™ GD-25 POM resin, 25% GF
Clutch base 600—DELRIN™ 500 resin
Clutch cam 700—HYLON™ 612PA resin
Clutch cap 1302—DELRIN™ 500 resin It will be understood that the invention disclosed and defined in this specification extends to all alternative combinations of two or more of the individual features mentioned or evident from the text or drawings. All of these different combinations constitute various alternative aspects of the invention.

The invention claimed is:

1. A clutch assembly for a roller door operator, the clutch assembly providing selective engagement with a drive wheel, the clutch assembly comprising a clutch cam with a first and second face, having spaced ratchet elements on the first face to interact with spaced pawl elements on a supporting surface against which the cam rotates, the cam having spaced alternating axial offset surfaces on the second face to interact with one or more spaced drive elements on a clutch lever, such that successive actuations and releases of the clutch lever alternately set different axial offsets between the clutch lever and the supporting surface, so alternating a rotatable driven element carried by the clutch lever between engaged and disengaged conditions with the drive wheel.

2. The clutch assembly of claim 1, wherein the supporting surface against which the cam rotates is provided by a clutch base, the clutch base configured to permit operative rotation of the clutch cam in a first rotational direction, the clutch base comprising two or more base ramps and two or more base mating walls, and wherein the clutch cam comprises two or more ratchet elements, each of which comprises a base-facing surface and a mating wall, wherein the base-facing surfaces of the ratchet teeth are configured to slide over the base ramps so causing abuttal of the base mating walls and the ratchet elements to prevent rotational movement of the clutch cam relative to the clutch base in the second direction.

3. The clutch assembly of claim 2, wherein the ratchet elements comprise outriggers projecting radially outwardly from the clutch cam.

4. The clutch assembly of claim 1, wherein the spaced alternating axial offset surfaces include, extending around the second face of the clutch cam, a high flat adjacent a low flat with an engage mating wall provided therebetween, wherein a clutch cam ramp extends between the low flat to a peak higher than the high flat with a disengage mating wall provided between the high flat and the peak.

5. The clutch assembly of claim 4, wherein the clutch lever comprises a cam-facing surface including a lever ramp and a lever mating wall, wherein the lever ramp slides over the second face of the clutch cam during rotational movement of the clutch lever in the second direction so causing abuttal of the lever mating wall and one of the engage mating wall and the disengage mating wall, and wherein the clutch cam rotates in the first direction with subsequent rotation of the clutch lever in the first direction.

6. The clutch assembly of claim 5, wherein the clutch cam comprises an alignment tab protruding over the engage mating wall.

7. The clutch assembly of claim 1, further comprising a spring configured to store torsional energy from the rotational movement of the clutch lever in the second direction, the spring also configured to release the stored torsional energy so causing the subsequent rotation of the clutch lever in the first direction.

8. The clutch assembly of claim 1, further comprising:
a clutch cover and a rotatable shaft in rotational communication with the rotatable driven element,
a position encoder unit mountable to the clutch cover and comprising an input shaft connected to, and driven directly by, the rotatable shaft.

9. The clutch assembly of claim 8, wherein the position encoder unit is configured to determine the angular position of the rotatable shaft.

10. The clutch assembly of claim 8, wherein said position encoder unit comprises an absolute position encoder arranged to sense the rotational position of a magnetic element driven by rotation of a position encoder input shaft, configured such that 360° of rotation of the magnetic element corresponds to more than the full travel of a door driven by the roller door operator.

11. The clutch assembly of claim 10, wherein the position encoder unit includes a worm gear drive connecting the position encoder input shaft and the magnetic element.

12. The clutch assembly of claim 1, the supporting surface provided by a clutch base and the assembly including a clutch cover, the assembly further including a torsion spring to bias the clutch lever to said first position, wherein a part of the torsion spring is configured to be accessible externally of the clutch cover in order to pre-load the torsion spring once the clutch assembly has been assembled between the clutch base and the clutch cover.

13. The clutch assembly of claim 12, wherein the torsion spring also acts as a compression spring to bias the components of the clutch assembly together for operative interaction.

14. The clutch assembly of claim 12, wherein the clutch cover includes a guidance part through which said part of the torsion spring passes to afford external access thereto, the guidance part allowing movement of said part of the torsion spring between positions of increasing torsional pre-load.

15. The clutch assembly of claim 14, wherein the guidance part includes one or more detent positions configured to provide retention of said part of the torsion spring in one or more prescribed pre-load states.

* * * * *